(12) United States Patent
Delker et al.

(10) Patent No.: US 9,794,647 B1
(45) Date of Patent: Oct. 17, 2017

(54) CENTRALIZED PROGRAM GUIDE

(75) Inventors: Jason R. Delker, Olathe, KS (US); John M. Everson, Leawood, KS (US); Von K. McConnell, Leawood, KS (US)

(73) Assignee: SPRINT COMMUNICATIONS COMPANY L.P., Overland Park, KS (US)

( * ) Notice: Subject to any disclaimer, the term of this patent is extended or adjusted under 35 U.S.C. 154(b) by 993 days.

(21) Appl. No.: 12/698,495

(22) Filed: Feb. 2, 2010

(51) Int. Cl.
*H04N 21/84* (2011.01)

(52) U.S. Cl.
CPC .................................... *H04N 21/84* (2013.01)

(58) Field of Classification Search
CPC ............... H04N 5/44543; H04N 5/765; H04N 21/4622; H04N 21/8133; H04N 21/4828; H04N 21/482
See application file for complete search history.

(56) References Cited

U.S. PATENT DOCUMENTS

| | | | |
|---|---|---|---|
| 6,701,527 B2 * | 3/2004 | Schein et al. | 725/43 |
| 7,929,538 B2 | 4/2011 | Gobara et al. | |
| 8,254,305 B1 | 8/2012 | Breau et al. | |
| 8,358,640 B1 | 1/2013 | Breau et al. | |
| 9,118,934 B2 | 8/2015 | Breau et al. | |
| 9,125,234 B1 | 9/2015 | Breau et al. | |
| 2001/0033554 A1 | 10/2001 | Ayyagari et al. | |
| 2004/0078807 A1 * | 4/2004 | Fries et al. | 725/14 |
| 2005/0058144 A1 | 3/2005 | Ayyagari et al. | |
| 2005/0097595 A1 * | 5/2005 | Lipsanen et al. | 725/25 |
| 2006/0095472 A1 | 5/2006 | Krikorian et al. | |
| 2006/0245403 A1 | 11/2006 | Kumar | |
| 2007/0211734 A1 | 9/2007 | Yang et al. | |
| 2008/0126550 A1 | 5/2008 | Yasuma | |
| 2008/0235358 A1 | 9/2008 | Moribe et al. | |
| 2009/0019485 A1 * | 1/2009 | Ellis et al. | 725/40 |
| 2009/0210908 A1 * | 8/2009 | Sammarco | 725/48 |
| 2009/0249067 A1 | 10/2009 | Lie et al. | |
| 2009/0307307 A1 | 12/2009 | Igarashi | |
| 2010/0080238 A1 | 4/2010 | Allan et al. | |
| 2010/0142530 A1 | 6/2010 | Zha et al. | |
| 2010/0162321 A1 * | 6/2010 | Bradley | 725/56 |

(Continued)

OTHER PUBLICATIONS

Notice of Allowance dated Apr. 11, 2012, U.S. Appl. No. 12/689,081, filed Jan. 18, 2012.

(Continued)

*Primary Examiner* — Nathan Flynn
*Assistant Examiner* — Christine Kurien (57) ABSTRACT

A processor-implemented method of accessing content is provided comprising a server composing a first list of broadcast content, wherein each entry in the first list comprises a link to access a broadcast content associated with the entry. The method also comprises the server composing a second list of stored content, wherein each entry in the second list comprises a link to access a stored content associated with the entry, and the server dynamically aggregating entries from the first list and the second list to compose a content guide. The method further comprises presenting at least a portion of the content guide on a display, wherein at least one entry from the first list and at least one entry from the second list are present at the same time on the display, and presenting content on the display based on selecting an entry from the guide.

7 Claims, 6 Drawing Sheets

(56) References Cited

U.S. PATENT DOCUMENTS

| | | |
|---|---|---|
| 2010/0211665 A1 | 8/2010 | Raza et al. |
| 2010/0322213 A1 | 12/2010 | Liu et al. |
| 2011/0107379 A1 | 5/2011 | Lajoie et al. |
| 2011/0158610 A1* | 6/2011 | Paul et al. .................... 386/297 |
| 2011/0179184 A1 | 7/2011 | Breau et al. |
| 2011/0270680 A1 | 11/2011 | Lim |
| 2011/0317678 A1 | 12/2011 | Allan et al. |
| 2012/0134291 A1 | 5/2012 | Raleigh |

OTHER PUBLICATIONS

Pre-Interview Communication dated Jun. 5, 2012, U.S. Appl. No. 12/791,859, filed Jun. 1, 2010.

Breau, Jeremy R., et al., Patent Application entitled "Femtocell Bridging in Media Local Area Networks," filed Jun. 1, 2010, U.S. Appl. No. 12/791,859.

"Address Resolution Protocol," Wikipedia, http://en.wikipedia.org/w/index.php?title=Address_Resolution_Protocol&printable=yes, (last visited Aug. 25, 2009).

Bahlmann, Bruce, "DLNA Basics, Bridging Services within a Connected Home," Communications Technology, http://www.cable360.net/print/ct/deployment/techtrends/23787.html, Jun. 1, 2007.

Bahlmann, Bruce, "Digital Living Network Alliance (DLNA) Essentials," Birds-Eye.Net, http://www.birds-eye.net/article_archive/digital_living_network_alliance_dlna_essentials.htm, Apr. 1, 2007.

"Network address translation," Wikipedia, http://en.wikipedia.org/w/index.php.title=Network_address_translation&printable=yes, Aug. 20, 2009.

Notice of Allowance dated Sep. 14, 2012, U.S. Appl. No. 12/791,859, filed Jun. 1, 2010.

Pre-Interview Communication dated Jan. 30, 2013, U.S. Appl. No. 12/689,121, filed Jan. 18, 2010.

Pre-Interview Communication dated Feb. 5, 2015, U.S. Appl. No. 13/711,544, filed Dec. 11, 2012.

Notice of Allowance dated Apr. 29, 2015, U.S. Appl. No. 13/711,544, filed Dec. 11, 2012.

Notice of Allowance dated Apr. 15, 2015, U.S. Appl. No. 12/689,121, filed Jan. 18, 2010.

FAIPP Office Action dated Apr. 11, 2013, U.S. Appl. No. 12/689,121, filed Jan. 18, 2010.

Final Office Action dated Jul. 17, 2013, U.S. Appl. No. 12/689,121, filed Jan. 18, 2010.

Breau, Jeremy R., et al., Patent Application entitled "Fenntocell Bridging in Media Local Area Networks," filed Dec. 11, 2012, U.S. Appl. No. 13/711,544.

Advisory Action dated Oct. 4, 2013, U.S. Appl. No. 12/689,121, filed Jan. 18, 2010.

Office Action dated Sep. 22, 2014, U.S. Appl. No. 12/689,121, filed Jan. 18, 2010.

* cited by examiner

CENTRALIZED PROGRAM GUIDE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Consumers of television and other video content may enjoy a wide range of viewing choices. Content may be drawn from broadcast television networks, cable television providers, and satellite television providers. Video content also may be drawn from providers on the Internet and other networks. Content may be broadcast live or may be previously recorded. Previously recorded content may be made available on a scheduled basis or played upon demand. Content may be received under paid subscription arrangement with a provider, for example a cable television provider or it may be available on demand on a pay per view basis. Content also may be stored and played on private networks, for example on a media local area network, such as a digital living network alliance (DLNA) network or other network. A plurality of storage and content-playing devices may be used on private networks, for example digital video recorder (DVR) devices and streaming receiver boxes that may provide motion picture streaming, video on demand, and sports programming delivered via the Internet. Content may be played on private networks comprising digital versatile disc (DVD), optical disc devices, Blu-ray Disc devices, and other devices. Software applications executing in private networks also may play content.

SUMMARY

In an embodiment, a processor-implemented method of accessing content is provided. The method comprises a program guide server composing a first list of broadcast content, wherein each entry in the first list comprises a link to access a broadcast content associated with the entry. The method also comprises the program guide server composing a second list of stored content, wherein each entry in the second list comprises a link to access a stored content associated with the entry. The method also comprises the program guide server dynamically aggregating entries from the first list and the second list to compose a content guide. The method also comprises presenting at least a portion of the content guide on a display, wherein at least one entry from the first list and at least one entry from the second list are presented at the same time on the display. The method also comprises presenting content on the display based on selecting an entry from the content guide.

In an embodiment, a program guide system is provided. The system comprises a computer system, a memory, coupled to the computer system, an application stored in the memory that, when executed by the computer system, composes a first list of broadcast content, each entry in the first list comprising a link to access a broadcast content associated with the entry in the first list. The system also composes a second list of content stored in a media local area network, each entry in the second list comprising a link to access a content stored in the media local area network associated with the entry in the second list. The system also composes a content guide comprising entries from the first list and the second list, and provides the content guide to a remotely logged in electronic device.

In an embodiment, a processor-implemented method of aggregating program guides is provided. The method comprises copying a first aggregated program guide from a first source, wherein the first aggregated program guide is comprised of an entry comprising a link to access a broadcast content and an entry comprising a link to access a stored content. The method also comprises copying a second aggregated program guide from a second source, wherein the second aggregated program guide is comprised of an entry comprising a link to access a broadcast content and an entry comprising a link to access a stored content. The method also comprises combining the first aggregated program guide and the second aggregated program guide to create a third aggregated program guide. The method also comprises discarding a duplicate entry from the third aggregated program guide. The method also comprises applying a preferences schedule to the third aggregated program guide to discard an undesired entry from the third aggregated program guide. The method also comprises applying the preferences schedule to organize entries in the third aggregated program guide according to a preferences list contained in the preferences schedule. The method also comprises storing the third aggregated program guide. These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches a centralized electronic program guide that aggregates program data about scheduled programming from independent sources, currently stored television programs, and video-on-demand. The system and methods taught herein integrate the gathered program data into a single electronic guide that may be accessed from a portable electronic device or other device in a convenient, centralized way. The content listed in the guide may be accessed and played when available by invoking commands presented on the portable electronic device.

Consumers of television and video media may wish to view live content or play back video content produced and distributed by a plurality of different sources. Discovering what content is available, when it is available, and how to economically access the content presents a challenge in an era of exploding media content and provider fragmentation. The present disclosure promotes the location, organization, and presentation of listings of access information about widely distributed and disparate video content.

A mobile telephone, for example, using Worldwide Interoperability for Microwave Access (WiMAX) technology may have fourth generation (4G) broadband access. The mobile telephone may access a program guide server operated by a telecommunications service provider. An application executing on the program guide server may make periodic contact with or maintain persistent sessions with providers of televised and other video content, for example broadcast network, cable, satellite, and Internet television and video content providers. The application gathers information from the providers about scheduled live content and available stored content. Video content referred to by the application also may be stored in devices in private networks, for example media local area networks, such as a digital living network alliance (DLNA) network. The information in the electronic program guide may be presented on a display of the portable electronic device. The electronic program guide alternatively may be accessible from a set-top box and displayed on a television, a monitor, or other display device coupled to the set-top box. The set-top box may be equipped with a fourth generation (4G) adapter or other hardware complying with fourth generation wireless standards.

In addition to providing the functionality that permits the portable electronic device to view, organize, and make menu choices about selectable and viewable content, the application executing on the program guide server also provides functionality that accesses and delivers content and listings about available content from providers upon request of the portable electronic device. The application may comprise a plurality of software components that establish session contact with or maintain persistent or semi-permanent contact with providers of content chosen. The session or persistent connections are used to search for and discover available programming and assemble references or links to the programming for use by the portable electronic device. The application may use various software tools such as search engines, search algorithms, and heuristic functions to discover content that may match the tastes and preferences of the user of the portable electronic device based on previous activity.

The application may provide the portable electronic device the opportunity to authenticate once for each session with the electronic program guide, after which the application forwards appropriate cached credentials to each content provider as needed. This alleviates the portable electronic device from having to supply credentials each time a content source is accessed. Subscription or other paid content from a content provider, for example a cable television provider or Internet video provider, may be released to the application for conveyance to the portable electronic device upon the application providing the stored credentials that may be required by the provider.

The application also promotes a combination or merging of program guides from a plurality of sources including distributors of content and providers of information about available content. The application also promotes merging program guides for live or streaming broadcasts or multicasts with what are effectively directories of more static stored or purchased/subscribed content. Program guides created by other aggregators may be merged and issues arising from subscription obligations, legal, and technical matters related to content referred to in source program guides may be identified by the application. The application provides functionality for duplicate and unwanted content to be deleted from the merged content guides. The application also promotes the program guide to be organized in the manner specified by the user of the portable electronic device, wherein folders and subfolders may be used to gather and categorize program content. The application also allows the program guide to be searched in a variety of manners, for example by content type, by content name, and by creation dates of program content.

Figure 1:
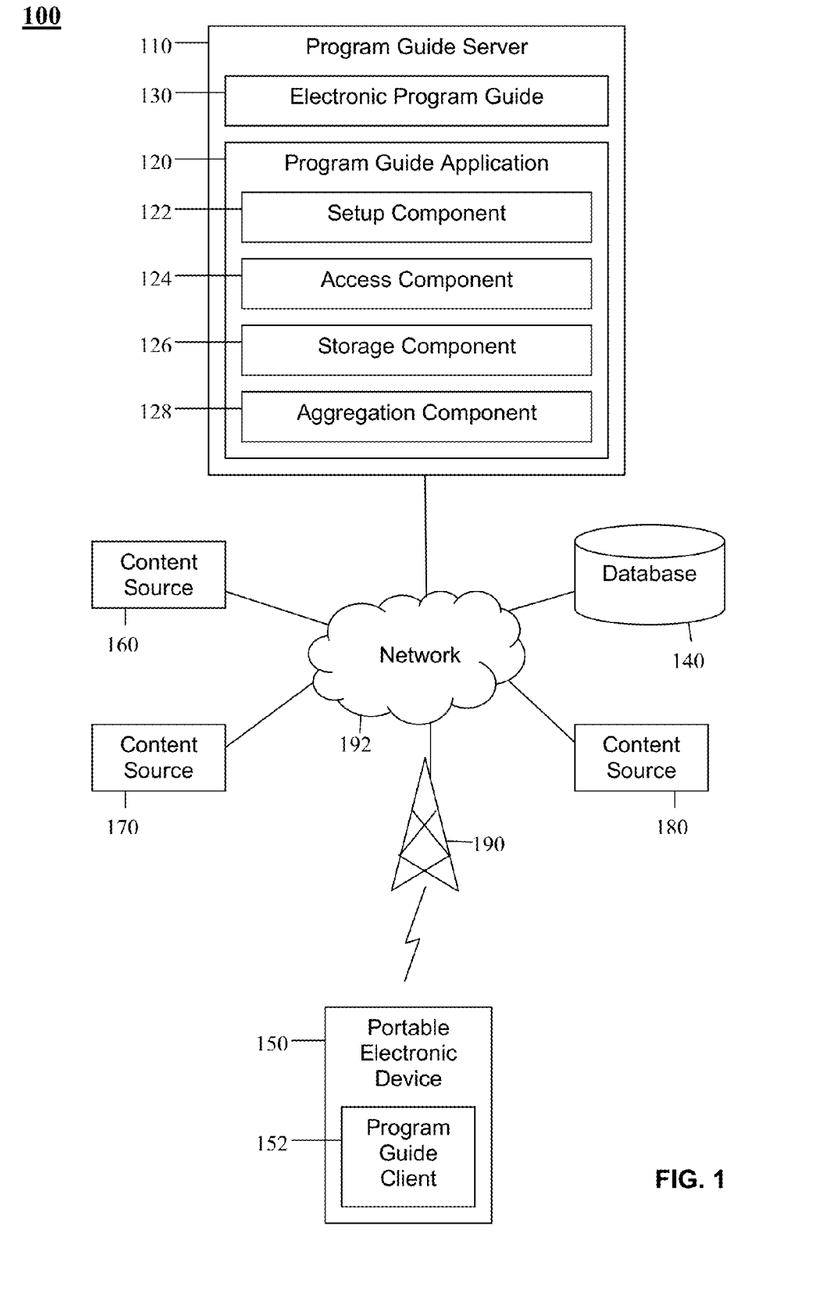
FIG. 1 is a block diagram of a system according to an embodiment of the disclosure.

Turning now to FIG. 1, a program guide system 100 is described. The system 100 comprises a program guide server 110, a program guide application 120, an electronic program guide 130, a database 140, a portable electronic device 150, a program guide client 152, content sources 160, 170, 180, a base transceiver station 190, and a network 192.

The program guide server 110 may be implemented by a computer system. Computer systems are discussed in greater detail hereinafter. The program guide application 120 executes on the program guide server 110, gathers listings of available content, and constructs links to televised and other video content from a plurality of independent content sources 160, 170, 180. The program guide application 120 organizes the information about the video content in an electronic program guide 130 according to preferences entered into the portable electronic device 150. The portable electronic device 150 may use a broadband wireless technology, for example the Worldwide Interoperability for Microwave Access (WiMAX), to request and receive content. The program guide application 120 provides the electronic program guide 130 for viewing and selection of information about televised and video content. The program guide application 120 also invokes the playing of requested content upon the request of the portable electronic device 150.

When an item of content listed in the electronic program guide 130 is selected for playback, the program guide application 120 invokes commands that cause the requested content to be accessed from the content sources 160, 170, 180. The requested content then may be played back directly from the content source 160 to the portable electronic device 150, for example played back in a streaming video fashion. The requested content alternatively then may be played back to a set-top box for display on a television, a monitor, or other display device coupled to the set-top box. The set-top box may be equipped with a fourth generation (4G) card or other fourth generation hardware. Alternatively, the content may be transmitted to the portable electronic device 150, for example downloaded to the portable electronic device 150 and then played or progressively downloaded to the portable electronic device 150 and played as the progressive download continues. The requested content may be accessed from video and television content providers of a plurality of types including broadcast and cable television networks, satellite providers, and Internet video content providers. The content may be received on a live basis, such as a televised sporting event or news report or Internet webcast. The content may be previously recorded and available on demand or at a scheduled time. The requested content may be stored within the infrastructure of a content provider 160, on the program guide server 110, in a media local area network, on the portable electronic device 150, or on another device. The previously recorded content may be television programming broadcasted months or years earlier and made available for viewing by a content source 160. The previously recorded content may be privately recorded and distributed content available to selected recipients over the Internet or other communication channel. In an embodiment, the requested content may not be played back from the content source 160. If requested content previously has been played back and has been cached or stored on the program guide server 110, in the database 140, or elsewhere, and the content is determined to be current, the content will be played back from the location wherein it was cached or stored.

The program guide application 120 presents a client-side graphical user interface for use on the portable electronic device 150. The program guide client 152 executes on the portable electronic device 150 and communicates with the program guide application 120 to provide commands, receive information about content, and present the client-side graphical user interface. The program guide client 152 may comprise a browser software application executing on the portable electronic device 150. Information about content available to the portable electronic device 150 may be organized and presented in a plurality of manners. The program guide application 120 permits searching of the electronic program guide 130 by program type, by program names, by scheduled times, and in other manners. While the program guide server 110 may locally store some viewable content accessible from the portable electronic device 150, items displayed in the graphical user interface on the portable electronic device 150, when clicked on or otherwise selected, may cause references or links to be activated to access content stored elsewhere.

The program guide application 120 also may comprise both components executing on the program guide server 110 and components executing elsewhere that initiate session contact with or maintain persistent connections with content sources 160, 170, 180. Because content may be stored at a variety of locations and may not be stored at all in the case of live content, the components of the program guide application 120 that find and access content may be located in several places and may perform a variety of functions. In some cases, the accessing of requested content and delivery to the portable electronic device 150 may involve the actions of several or many components located in different places. The present disclosure teaches the program guide application 120 presenting information about the availability of a plurality of items of content in the electronic program guide 130 and providing access to those items wherever the content is created and/or stored and however it is delivered to the portable electronic device 150. The locations of various items of content and the manner in which the content is delivered may not be apparent to a user of the portable electronic device 150.

The program guide application 120 may aggregate and merge program guides from a plurality of content sources 160, 170, 180 to create the electronic program guide 130. The program guide application 120 may receive and execute commands regarding how multiple program guides are to be merged. The commands may describe how duplicate and unwanted items are to be discarded and the merged content organized according to expressed preferences. The program guide application 120 may facilitate a streamlined process of authentication by permitting a single authentication to be received from the portable electronic device 150. The program guide application 120 then, as necessary, may draw stored credentials required by various sources of content and convey the stored credentials to the sources when selected by the portable electronic device 150.

The electronic program guide 130 may be user-profile specific. The portable electronic device 150 may have a profile stored on the program guide server 110, in the database 140, or elsewhere that may be accessed and read by components of the program guide application 120 before the electronic program guide 130 may be made available to the portable electronic device 150 or to a set-top box. The profile may describe content sources 160, 170, 180 that may be accessible for the portable electronic device 150 and its user specific, that may include a network path to those content sources 160, 170, 180, and that may include a user name, remote identification, and remote password that may be required by the content sources 160, 170, 180. Because the profile is associated with the program guide 130, the program guide 130 may log into the account of the portable electronic device 150 and/or its user at each content source 160, 170, 180 and draw or pull relevant information. The content sources 160, 170, 180 themselves also may be profile-specific, and the program guide 130 may maintain access to profiles for portable electronic devices 150 provided access to the content sources 160, 170, 180. In an embodiment, when the program guide 130 is associated with a single portable electronic device 150, access to the program guide 130 may be provided by permission to other portable electronic devices 150 and the multiple portable electronic devices 150 may simultaneously access the program guide 130.

In an embodiment, the program guide server 110 may be operated by a telecommunications service provider that may provide a plurality of services to the portable electronic device 150 including providing the electronic program guide 130 and the services of the program guide application 120. As a subscriber to the electronic program guide 130, the portable electronic device 150 may be provided an account by the telecommunications service provider. Credentials and linkages to content sources 160, 170, 180 or references to them would be listed in the electronic program guide 130. When the program guide client 152 is invoked on the portable electronic device 150, the listings in the electronic program guide 130 are displayed on the portable electronic device 150. After authenticating, a selectable item representing a playable article of video content may be clicked on or otherwise activated. This action invokes commands that are wirelessly transmitted to the program guide server 110. The program guide application 120 may invoke a uniform resource locator (URL) or a uniform resource identifier (URI) or cause a media manager application executing on the program guide server 110 or elsewhere to activate. The program guide application 120 may pass credentials in its message that permits access to the content. As an alternative, when the selectable item representing a playable article of video content is clicked on or otherwise activated on the portable electronic device 150, the commands may not be transmitted to the program guide server 110. The commands rather may be transmitted directly to the content source 160 providing the chosen content, and the content may be sent from the content source 160 to the portable electronic device 150 without the involvement of the program guide server 110. In an embodiment, the uniform resource locator (URL) or the uniform resource identifier (URI) invoked by the portable electronic device 150 to access the content source 160 may involve the entry of credentials by the user of the portable electronic device 150. When the user of the portable electronic device 150 chooses a program to watch, the program guide client 152, that may be a browser application, is provided a uniform resource locator (URL) or uniform resource identifier (URI) to follow. The uniform resource locator (URL) or the uniform resource identifier (URI) may work within the browser or may launch a separate client that in turn connects to the content source 160, 170, 180 and retrieves keys and content for playback.

The portable electronic device 150 may be a mobile telephone, a personal digital assistant (PDA), or a media player. The portable electronic device 150 transmits and receives based on at least one of a code division multiple access (CDMA) technology, a global system for mobile communication (GSM) technology, a long-term evolution (LTE) technology, and a worldwide interoperability for microwave access (WiMAX) technology. While FIG. 1 depicts only one portable electronic device 150, in an embodiment a plurality of portable electronic devices 150 may be existent and in operation. In an embodiment, the functionality taught by the present disclosure for the portable electronic device 150 may apply to a stationary device such as a desktop computer or other electronic device that is not regularly moved about. A desktop computer may be installed with the program guide client 152, subscribe to a telecommunications service provider for the electronic program guide 130, and receive the services of the program guide application 120 in the same manner as would the portable electronic device 150. Actions attributed above to the portable electronic device 150 in accessing the program guide application 120 including accessing content from content sources 160, 170, 180 alternatively may be taken by a set-top box coupled to a television, a monitor, or other display device. The set-top box may be coupled to or comprise a fourth generation wireless communication card and/or interface. The set-top box may be controlled via a remote control and/or by inputs received wirelessly from the portable electronic device 150, for example via a radio frequency communication link, an optical communication link, an ultrasonic communication link, or some other contactless communication link between the set-top box and the portable electronic device 150.

Content sources 160, 170, 180 comprise providers of video and other content that may be described in the electronic program guide 130 and accessed through commands to the program guide application 120. Content sources 160, 170, 180 may comprise network broadcast television networks and their affiliate stations, cable television providers, and satellite television providers. Content sources 160, 170, 180 also may comprise providers of television and video content from the Internet or other media that may use the Internet protocol (IP). Such providers may comprise Internet websites that offer streaming video of television programming and movies distributed by broadcast networks and motion picture studios. Websites also may offer privately created and distributed content that is streamed on a live or prerecorded basis. Digital content may be delivered in accordance with the standards developed by the Advanced Television Systems Committee (ATSC) for digital television transmission, including high definition television (HDTV). Such content also may be delivered to the portable electronic device 150 using the Mobile-Pedestrian-Handheld™ platform that may allow local television stations to deliver digital, Advanced Television Systems Committee-compatible content to portable devices such as mobile phones, portable media players, laptop computers, personal navigation devices, and automobile-based entertainment systems.

While content sources 160, 170, 180 have been described as providers of content, for example independent entities such as television networks or Internet web sites, content sources 160, 170, 180 also may comprise devices that may aggregate and distribute video content. Such devices may be located in media local area networks. Such content sources 160, 170, 180 may comprise a television streaming device that enables users of the portable electronic device 150 to remotely view their home's cable, satellite, or personal video recorder programming from an Internet-enabled computer with a broadband Internet connection. Such content sources 160, 170, 180 may comprise digital video recorder (DVR) devices that provide an electronic television programming schedule and features that permit subscribers to not miss episodes of selected programming. Such devices may allow the portable electronic device 150 to discover and record programming that matches user interests by title, actor, director, category, or keyword. Such devices also may provide other features when the device is connected to a home network, for example a media local area network, including film and television programming downloads, advanced search, personal photograph viewing, music offerings, and online scheduling. In an embodiment, the media local area network may comprise a digital living network alliance network. Content sources 160, 170, 180 may comprise streaming receiver boxes that may provide motion picture streaming, video on demand, and sports programming delivered via the Internet or other communication networks. Such streaming receiver boxes may not use internal storage but may rather rely on wireless technology to stream digital audio over the network 192 from the content source 160. Content sources 160, 170, 180 may comprise online digital versatile disc (DVD), Blu-ray Disc devices, optical disc devices, and other devices and services offering online streaming to customers of motion pictures and other video content. Content sources 160, 170, 180 may also comprise software applications, for example an application that may allow a computer with the necessary hardware to effectively become a network streaming digital video recorder (DVR), a digital multimedia home entertainment system, or home theater computer.

The program guide server 110 itself and/or the database 140 associated with the program guide server 110 also may store content that may be accessed by the portable electronic device 150. Some content, because of its nature or because it is frequently viewed by the portable electronic device 150 and others, may be stored in the program guide server 110 or the database 140. Some content, for example content that is viewed frequently and uses limited storage capacity, may be stored in the portable electronic device 150 and remain accessible there.

The program guide application 120 comprises the setup component 122 that establishes an account for a portable electronic device 150 to access a newly created electronic program guide 130 and use the services of the program guide application 120. The setup component 122 creates a new electronic program guide 130 when the portable electronic device 150 enters into a subscription agreement with the telecommunications service provider or other provider of the electronic program guide 130. The setup component 122 initially may provide a blank electronic program guide 130 and allow the portable electronic device 150 to create its own guide structure and insert its own programming listings. The setup component 122 may provide a default electronic program guide 130 with sample or suggested guide structure and program listings of content sources 160, 170, 180 that may be promoted by the telecommunications service provider. The setup component 122 may provide information to the portable electronic device 150 on how it may contact various content sources 160, 170, 180 and make arrangements to receive live and/or stored content. Such arrangements may comprise setting up payment schedules with the content sources 160, 170, 180 when the content is offered under paid subscription. Such arrangements also may comprise establishing credentials with the content sources 160, 170, 180 with the setup component 122 storing the credentials and configuring the credentials to be passed at the appropriate times without action by the portable electronic device 150.

The setup component 122 creates a primary interface on the portable electronic device 150 that is a graphical representation of the electronic program guide 130 executing on the program guide application 120. The setup component 122 may install the program guide client 152 on the portable electronic device 150. The interface provided by the program guide client 152 may be an index or listing of program items. Some of the items displayed in the interface on the portable electronic device 150, when clicked or otherwise selected, may activate references or links to files that invoke the playing of content when desired content is scheduled to be played. Other program items viewable in the interface may, when selected, cause folders to be opened that contain listings of playable content or folders that contain subfolders containing such content listings. Selecting a line item, icon, or other object from within the interface may cause communication to begin between the program guide client 152 executing on the portable electronic device 150 and the program guide application 120.

The setup component 122 also may provide instructions for storing and accessing content saved in a media local area network that may be a privately operated network with access granted to a limited quantity of parties. A media local area network may be a home network wherein the simple service discovery protocol (SSDP), a multicast protocol, is the default protocol. Content sources 160, 170, 180 situated on a media local area network may comprise some of the content storage and playback devices described above that download, store, and play content from broadcast, Internet, and other sources. Other such content sources 160, 170, 180 on a media local area network may play content from hard copy media played on devices such as digital versatile disc (DVD) and optical disc storage players. Private content sources 160, 170, 180 resident in a media local area network may have client components that access the program guide 130 and send relevant information about content available in the private content sources 160, 170, 180.

The program guide application 120 also comprises the access component 124 that receives instructions from the portable electronic device 150 to retrieve stored video content or tune into live televised content. Depending on what the requested content is, where it is stored, how it is drawn and received from its content source 160, and whether the content is live or previously recorded, the access component 124 may activate different software components and take different actions. When the requested content is live broadcast network, cable, or satellite television, the access component 124 may open a channel with the content source 160, provide credentials if necessary, and pass the live content on through to the portable electronic device 150. When the requested content is previously recorded, a similar process may take place with a content library or archive that is controlled by the content source 160, whether the content is provided upon demand of the portable electronic device 150 or is played at a scheduled time.

When the requested content is provided by a content source 160 that is an Internet site, the access component 124 may access a uniform resource locator (URL), provide credentials, and begin receiving the content encapsulated in Internet protocol (IP) packets. The access component 124 may perform cleansing or scrubbing of the content to remove unwanted commercial content or to improve the quality of the content and then relay the content on to the portable electronic device 150. These steps may be performed whether the content is stored and played on demand by the content source 160 or played at a scheduled time for requesting portable electronic devices 150.

The requested content may be privately stored in devices available to a limited quantity of parties, for example devices on a media local area network. Such devices may be television and video streaming devices, digital video recorders (DVR) streaming receiver boxes, and online digital versatile disc (DVD) and optical disc players. Such devices also may be computers that execute special media-playing applications. Each of these devices may communicate on the media local area network using the simple service discovery protocol (SSDP). Devices outside of the media local area network may not be able to communicate directly with devices associated with the media local area network. Since the simple service discovery protocol is a multicast protocol, routers and other devices external to the media local area network that wish to forward packets to devices inside the media local area network may encapsulate their messages inside Internet protocol packets. The access component 124 may examine tables stored in the program guide server 110 or elsewhere that lists media local area networks and external devices that are authorized to communicate with the media local area networks. When authorized, the access component 124 may encapsulate content directed to a device on the media local area network into an Internet protocol packet. The packet is directed to a bridging device associated with the destination media local area network. Upon receipt, the bridging device multicasts the packet within the media local area network whereupon the device that will play the content takes delivery of the packet. For further details about bridging into a media local area network and/or bridging between media local area networks, see U.S. patent application Ser. No. 12/689,081, filed Jan. 18, 2010, entitled "System and Method for Bridging Media Local Area Networks," by Jeremy R. Breau, et al., which is herein incorporated by reference.

When a device within the media local area network is sending content, for example when a video player begins playing a video segment for the benefit of an authorized portable electronic device 150 located outside the media local area network, the device multicasts the video segment using the simple service discovery protocol. The bridging device receives the video segments, encapsulates the video segment packets into Internet protocol packets, and sends the packets to the program guide server 110. The access component 124 receives the packets, consults the table to determine if the destination portable electronic device 150 is authorized to receive the content, and if so, encapsulates the content into an Internet protocol packet addressed to the portable electronic device 150, and forwards it on.

The access component 124 handles the forwarding of traffic between devices outside the media local area network and the devices within the media local area network that receive and play content. Because permissions may be involved and messages are received, de-capsulated, re-encapsulated, and forwarded, the access component 124 takes a plurality of actions when processing the transmission of televised and other video content for devices on media local area networks and external portable electronic devices 150.

The access component 124 may locate and present to the portable electronic device 150 information about more than one version of a single item of content. In an embodiment, a single television program may be available in several versions. For example, a high definition version of the program, a non-high definition version, an uncut version that may contain amusing bloopers, and an expanded version that contains outtakes and director, producer, and actor interviews may be available. In an embodiment, the identical version of a live or previously recorded television broadcast may be available, one version from a national broadcaster provided through a local affiliate and the second version available via an Internet webcast. The access component 124 may record, store, and make available both versions to the portable electronic device 150.

The access component 124 may additionally comprise software agents or back end client components that execute on the program guide server 110 or are sent to servers or other devices associated with content sources 160, 170, 180. These agents or components periodically may send messages to the content sources 160, 170, 180 requesting specific content designated by the portable electronic device 150 or requesting a general listing of content. The agents or components may provide functionality for channels or sessions to be temporarily or persistently constructed between the content sources 160, 170, 180 and the program guide server 110 or other device receiving requested content.

While the discussion herein has described the access component 124 locating requested content at content sources 160, 170, 180 and assisting in delivering the content to the portable electronic device 150, the access component 124 in an embodiment may deliver only information about accessible content to the electronic program guide 130 for viewing by the portable electronic device 150. When the portable electronic device 150 requests content described in the electronic program guide 130 as available, the content sources 160, 170, 180 may deliver the requested content directly to the portable electronic device 150 without action or involvement by the program guide server 110 or components of the program guide application 120.

The program guide application 120 also comprises the storage component 126 that stores received content as requested by the portable electronic device 150. The portable electronic device 150 may have subscription arrangements with a plurality of content sources 160, 170, 180. On a regular or sporadic basis, the content sources 160, 170, 180 may send requested content to the portable electronic device 150 for its viewing. For example, a content source 160 that provides sports television content under subscription may send a block of video once per week containing sports video highlights for the previous week to the portable electronic device 150. The user of the portable electronic device 150 may wish to view the video at a time of his or her convenience. The received video may be stored in the program guide server 110, in the database 140 associated with the program guide server 110, or elsewhere.

The portable electronic device 150 may specify the duration that received content is stored and may specify how the received content is to be prioritized. Since the portable electronic device 150 may subscribe to an electronic program guide service offered by a telecommunications service provider, the user of the portable electronic device 150 may have to pay for additional storage of large quantities of video content. The storage component 126 may overwrite some stored content at the direction of the portable electronic device 150 and/or the program guide application 120. The storage component 126 may store some downloaded content and direct or request that other downloadable content remain within the storage of the content sources 160, 170, 180 until requested by the portable electronic device 150.

The storage component 126 also may manage storage capacity by caching content for predetermined periods of time depending on the access habits of the user of the portable electronic device 150. The storage component 126 may work with the access component 124 to determine when stored content is the most current version of the content and therefore does not need to be updated by a transmission that the access component 124 may be currently handling or scheduled to handle. These actions may reduce write operations to the database 140 that consume processing capacity and may reduce traffic on the network 192.

The program guide application 120 also comprises the aggregation component 128 that gathers and merges program guides from a plurality of content sources 160, 170, 180 and may combine the merged program guides with the electronic program guide 130. A plurality of content sources 160, 170, 180 each may publish their own program guides listing their programming. The guides may provide the schedules for future programming to be broadcasted. The guides also may describe previously recorded programming that is stored and available for downloading at the option of the portable electronic device 150. The aggregation component 128 periodically may make requests of content sources 160, 170, 180 to send their program guides to the program guide server 110. The aggregation component 128 may make arrangements with content sources 160, 170, 180 for the content sources 160, 170, 180 to push their program guides to the program guide server 110 on a regular basis, for example daily, weekly, or monthly. The frequency of receipt of program guides from content sources 160, 170, 180 may depend on the nature of the video content provided by a content source 160. A television broadcast network, for example, may set its broadcast schedule a month or more in advance. An Internet web site that sells video content of celebrities or other public figures going about their daily lives may publish small segments of video content with little or no notice.

The aggregation component 128 receives and merges program guides from the content sources 160, 170, 180 with the electronic program guide 130 to create an updated electronic program guide 130. In an embodiment, a portable electronic device 150 could have two or more electronic program guides 130 to segregate content. For example, a first electronic program guide 130 could be for children in a household and a second electronic program guide 130 could be for adults in the household. The aggregation component 128 permits duplicate and unwanted items to be deleted from the merged electronic program guide 130. When program guides from different content sources 160, 170, 180 are merged and consolidated with an existing electronic program guide 130, rules may be configured regarding how and when content may be played from the content sources 160, 170, 180.

While the aggregation component 128 promotes mergers of program guides provided by content sources 160, 170, 180, the aggregation component 128 also promotes mergers of program guides that may have been created by entities other than content sources 160, 170, 180. Program guides that may be located and merged by the aggregation component 128 also may have been created by publishers of information about televised and Internet content, for example, that do not themselves create or distribute content as described herein. Such publishers may only provide content listings, for example. Program guides that may be located and merged may have been created by other entities, for example by human beings, and such program guides may themselves represent combinations of a plurality of other program guides gathered from content sources 160, 170, 180 and elsewhere. Such program guides created by human beings may be highly customized to the tastes and preferences of such individuals and such customization may be attractive to a party combining such program guides.

The program guide 130 may be created by merging a plurality of third party program guides created by human beings or other third parties that are not creators, producers, or distributors of video content or formal information providers. Such "homemade" or personal program guides themselves may be mergers or aggregations of other program guides and disparate programming information. Such third party guides that may be merged by the aggregation component 128 may comprise records of programs watched by the persons who created the third party guides, previously recorded content, content scheduled to be recorded, and/or content marked or highlighted by an identified user. The aggregation component 128 may obtain the information about programming from such personalized or third party program guides or it may pull "highlighting" information about available content or make recording decisions based on parallel decisions of the persons or other entities that created the third party program guides.

Third party or personalized program guides received in whole or in part by the program guide server 110 for merger by the aggregation component 128 each may have their own individual structures and attributes. Content listings and access links contained in the third party guides may be organized in a variety of personalized fashions by the users that created the third party guides. Content listings may be organized by content type, by dates received, or in some other manner based on the tastes and preferences of the person(s) that created the specific third party guide. When the aggregation component 128 merges a plurality of these third party or personalized program guides to create a new or updated version of the program guide 130, the individual structures of the source third party program guides may be fully or partially dismantled and the listings then merged. The merged and reconstituted program guide 130 may simultaneously display the contents of the merged third party guides in a blended or consolidated manner without visible distinctions between the original or component structures of the merged program guides.

The process of merging program guides by the aggregation component 128 may be a more involved process than merging gathered listings of content and removing duplicate and unwanted items from the merged guides. Some content associated with sourced program guides may be covered by subscription arrangement, for example. The party merging the program guides and wishing to access content covered by subscription may not be able to immediately do so without contacting the content source 160 for that content and initiating a subscription.

In addition, content made available through source program guides and merged by the aggregation component 128 may not be accessible by the party merging the program guides without permission from the content source 160 distributing the content. The human being or other party with the source program guide that is permitting another party to copy his or her program guide and perhaps merge it with other program guides may not have the legal right to convey items in their source program guide to another party for reproduction without permission from the content source 160. While program guides provide access to content and not the content itself, the content source 160 may have restrictions in place with its subscribers or other parties to which it has granted access to its content that prohibit such parties from conveying rights to access without consent from the content source 160. Some content accessible via references and linkages in source program guides may be copyrighted, for example, and parties provided access to the copyrighted material may be prohibited under their subscription or other agreement with the content source 160 from conveying access to the material.

The aggregation component 128, in merging program guides from a plurality of sources wherein the program guides themselves may contain merged program guides, may identify such subscription-related problems and content access rights-related issues. The aggregation component 128 may assist in resolving such issues and conflicts and may help protect the party receiving program guides from various sources for merger from legal liability. The aggregation component 128 may highlight legal obligations that arise from receiving access to content when program guides are merged. The aggregation component 128 also may assist with technical problems arising from mergers wherein Uniform Resource Locator (URL) links and references received in merged program guides fail because parameters need to be added or pointers within the links and references need to be changed.

The base transceiver station 190 may be any of a cellular wireless base station, for example a Code Division Multiple Access (CDMA) base station, a Global System for Mobile Communications (GSM) base station, a Universal Mobile Communications System (UMTS) base station, and/or Long-term Evolution (LTE) cellular wireless base station; a Worldwide Interoperability for Microwave Access (WiMAX) base station; a WiFi access point; a femtocell; or a base station accessible by other wireless access devices. While FIG. 1 depicts only one base transceiver station 190, in an embodiment a plurality of base transceiver stations 190 may be existent and in operation.

The network 192 promotes communication between the components of the system 100. The network 192 may be any communication network including a public data network (PDN), a public switched telephone network (PSTN), a private network, and/or a combination thereof.

Figure 2:
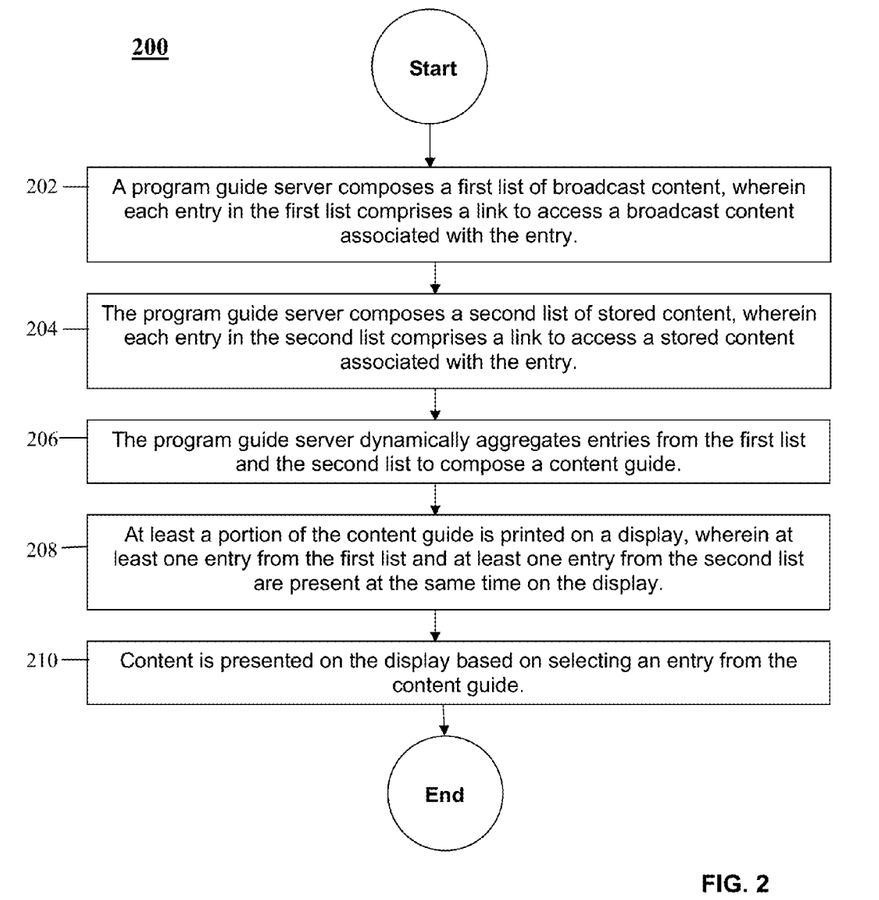
FIG. 2 is a flow chart illustrating a method according to an embodiment of the disclosure.

Turning now to FIG. 2, a processor-implemented method 200 of accessing content is provided. Beginning at block 202, the program guide server 110 composes a first list of broadcast content, wherein each entry in the first list comprises a link to access a broadcast content associated with the entry.

At block 204, the program guide server 110 composes a second list of stored content, wherein each entry in the second list comprises a link to access a stored content associated with the entry. At block 206, the program guide server 110 dynamically aggregates entries from the first list and the second list to compose a content guide. The program guide server 110 composes the electronic program guide 130 comprising entries from the first list and the second list.

At block 208, at least a portion of the electronic program guide 130 is presented on a display wherein at least one entry from the first list and at least one entry from the second list are present at the same time on the display. At block 210, content is presented on the display based on selecting an entry from the electronic program guide 130. In an embodiment, the portion of the electronic program guide 130 and the content may be presented on the portable electronic device 150 and/or on a television, monitor, or other display coupled to a set-top box.

Figure 3:
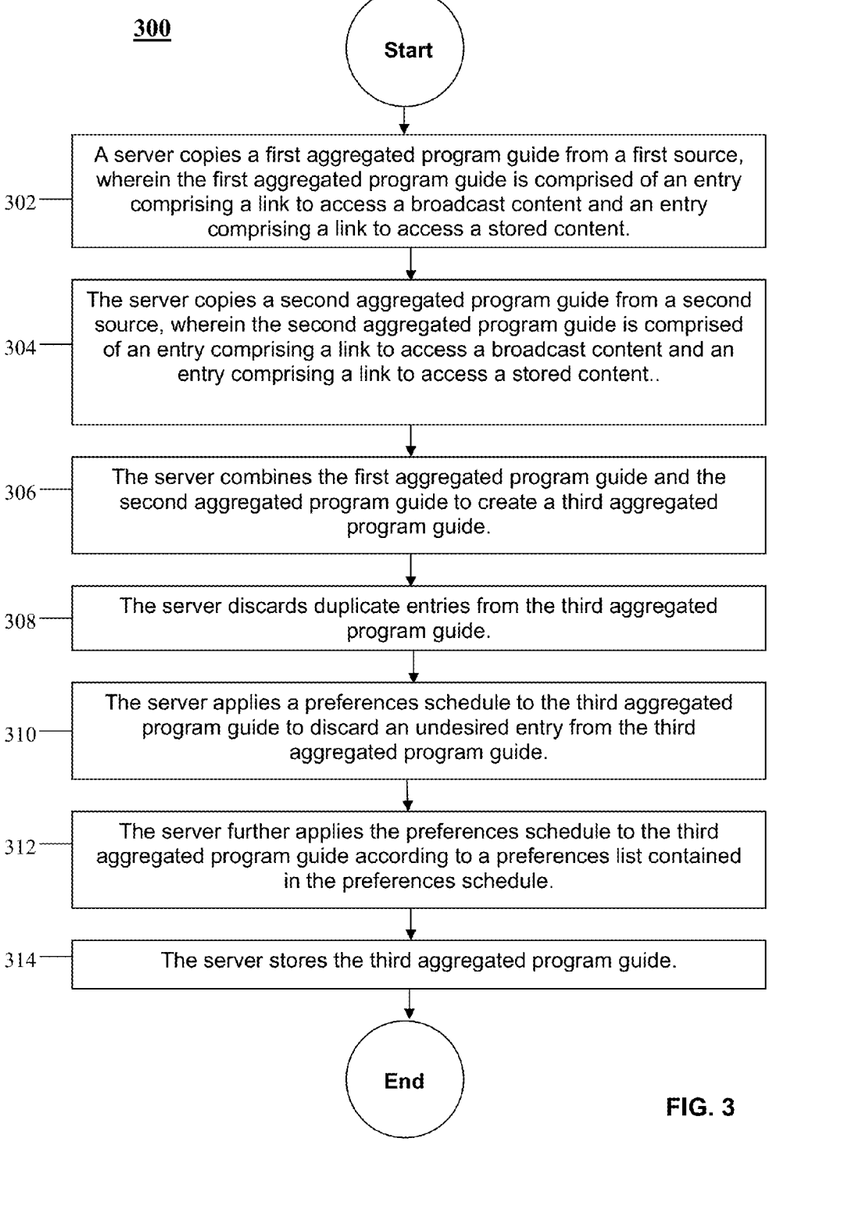
FIG. 3 is a flow chart illustrating a method according to an embodiment of the disclosure.

Turning now to FIG. 3, a processor-implemented method 300 of aggregating program guides is provided. As an exemplary use case, method 300, for example, may be used by Joe to modify his own program guide to include at least portions of his friend Bill's program guide, because Joe appreciates that Bill's program guide identifies some content that Joe likes and would enjoy accessing from his own portable electronic device 150 and/or set-top box. Beginning at block 302, the program guide server 110 copies a first aggregated program guide from a first source wherein the first aggregated program guide is comprised of an entry comprising a link to access a broadcast content and an entry comprising a link to access a stored content. In an embodiment, the first aggregated program guide may be a program guide created and/or built by a user for personal use, for example an instance of the program guide 130.

At block 304, the program guide server 110 copies a second aggregated program guide from a second source wherein the second aggregated program guide is comprised of an entry comprising a link to access a broadcast content and an entry comprising a link to access a stored content. In an embodiment, the second aggregated program guide may be a program guide created and/or built by another user for personal use, for example another instance of the program guide 130. The broadcast content accessed by the first aggregated program guide may be the same as or different from the broadcast content accessed by the second aggregated program guide. The stored content accessed by the first aggregated program guide may be the same as or different from the stored content accessed by the second aggregated program guide. At block 306, the program guide server 110 combines the first aggregated program guide and the second aggregated program guide to create a third aggregated program guide that may be the electronic program guide 130.

At block 308, the program guide server 110 discards a duplicate entry from the third aggregated program guide. At block 310, the program guide server 110 applies a preferences schedule to the third aggregated program guide to discard an undesired entry from the third aggregated program guide.

At block 312, the program guide server 110 further applies the preferences schedule to the third aggregated program guide to organize content listings according to a preferences list contained in the preferences schedule. At block 314, the program guide server 110 stores the third aggregated program guide. The third aggregated program guide may be yet another instance of the program guide 130, and the third aggregated program guide may be used by the same user who created and/or made use of the second aggregated program guide.

Figure 4:
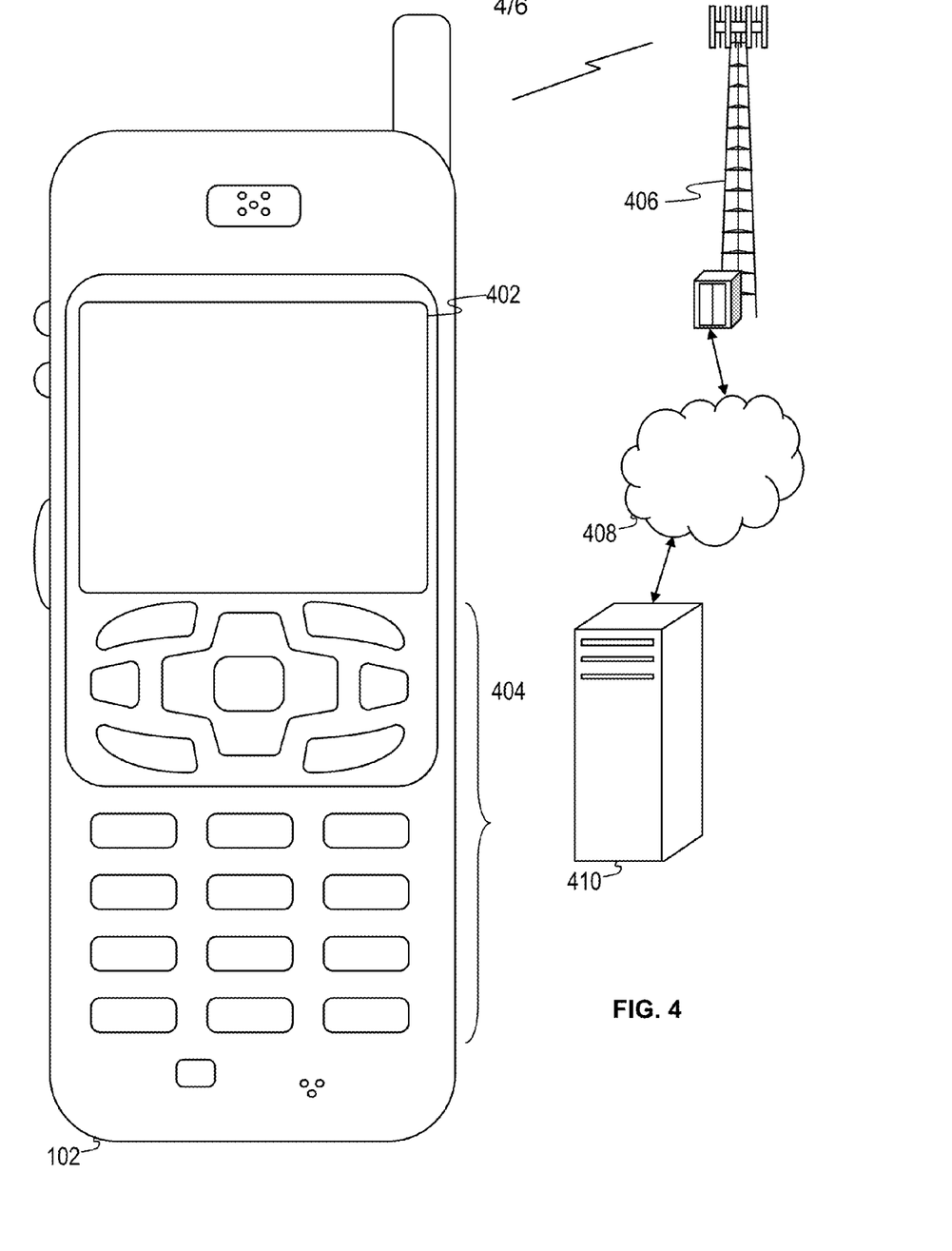
FIG. 4 is an illustration of a mobile device according to an embodiment of the disclosure.

FIG. 4 shows a wireless communications system including a mobile device 102. FIG. 4 depicts the mobile device 102, which is operable for implementing aspects of the present disclosure, but the present disclosure should not be limited to these implementations. The mobile device 102 may in some embodiments exemplify the portable electronic device 150 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface and/or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 402 to show a web page. The web page may be obtained via wireless communications with a base transceiver station (BTS) 406, a wireless network access node, a peer mobile device 102 or any other wireless communication network or system. While a single base transceiver station 406 is illustrated, it is understood that the wireless communication system may comprise additional base transceiver stations. In some instances, the mobile device 102 may be in communication with multiple base transceiver stations 406 at the same time. The base transceiver station 406 (or wireless network access node) is coupled to a wired network 408, such as the Internet. Via the wireless link and the wired network, the mobile device 102 has access to information on various servers, such as a server 410. The server 410 may provide content that may be shown on the display 402. Alternately, the mobile device 102 may access the base transceiver station 406 through a peer mobile device 102 acting as an intermediary, in a relay type or hop type of connection.

Figure 5:
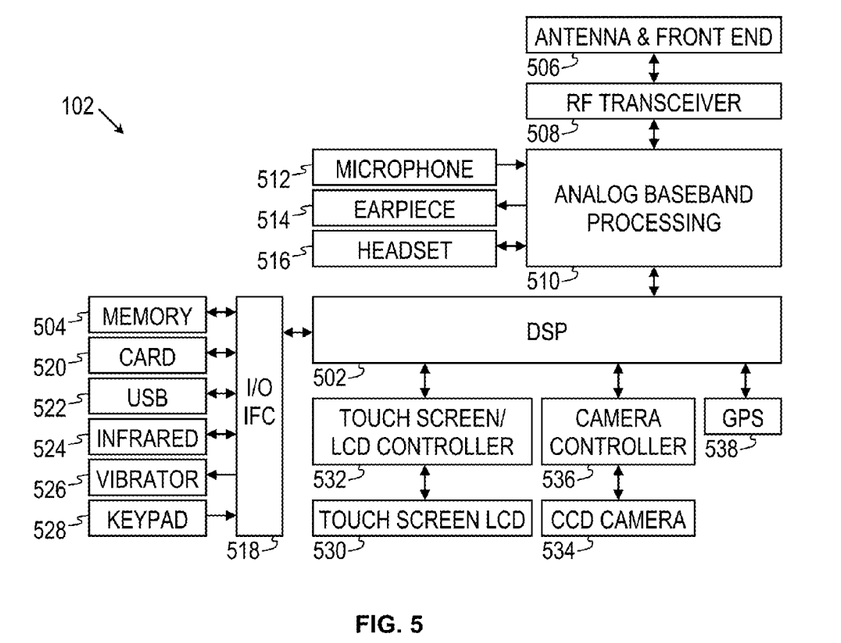
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
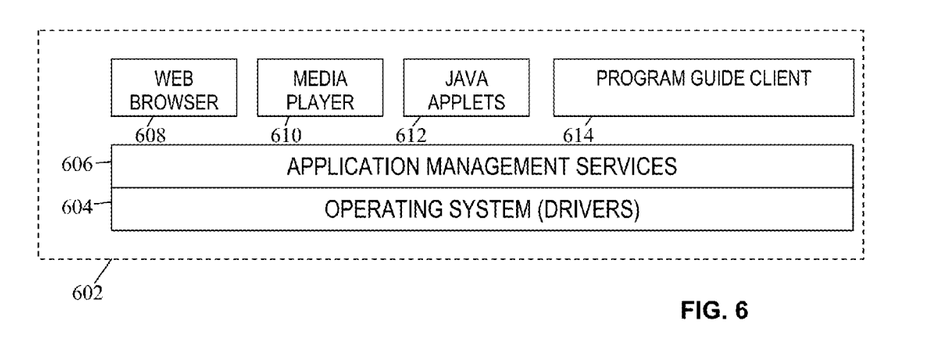
FIG. 6 is a block diagram of a software architecture for a mobile device according to an embodiment of the disclosure.

FIG. 6 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The program guide client 614 may correspond to the program guide client 152 described by the system 100.

Figure 7:
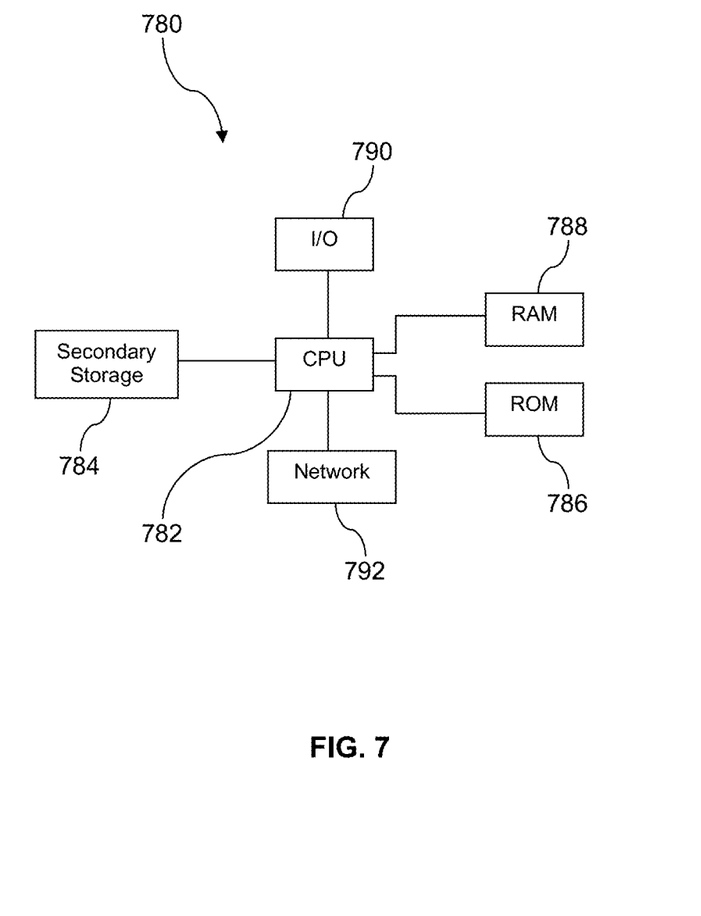
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A processor-implemented method of aggregating program guides, comprising:
    dynamically aggregating, by a program guide server executing at least one processor, a first aggregated program guide based on a first profile that comprises preferences associated with a first portable electronic device;
    copying, by the program guide server, the first aggregated program guide from a first source associated with the first portable electronic device, wherein the first aggregated program guide comprises a plurality of content entries;
    dynamically aggregating, by the program guide server, a second aggregated program guide based on a second profile that comprises preferences associated with a second portable electronic device;
    copying, by the program guide server, the second aggregated program guide from a second source associated with the second portable electronic device, wherein the second aggregated program guide comprises a plurality of content entries, wherein each content entry of the plurality of content entries in the first and second aggregated program guides comprises a link to access a content of one of a plurality of content sources, and wherein the plurality of content sources comprises one or more of broadcast content providers, internet content providers, and stored content providers;
    combining, by the program guide server, the first aggregated program guide and the second aggregated program guide to create an integrated program guide;
    discarding, by the program guide server, a duplicate entry from the integrated program guide;
    discarding, by the program guide server, an undesired entry from the integrated program guide, based on at least one of the first profile and the second profile;
    storing, by the program guide server, the integrated program guide in a communicatively coupled non-transitory memory;
    providing, by the program guide server, the integrated program guide to the first portable electronic device, wherein the first portable electronic device is remotely logged in and comprises a display, and wherein two or more of a broadcast content entry, a stored content entry, and an internet content entry are concurrently presented on the display of the first portable electronic device; and
    responsive to a selection of a link to an entry from the integrated program guide that is presented on the display of the first portable electronic device, distributing, by the program guide server to at least one of the plurality of content sources associated with the selected entry, at least one credential for content that is associated with the selected entry, wherein distribution of the at least one credential enables delivery of the content directly from the at least one of the plurality of content sources to the first portable electronic device.

2. The method of claim 1, wherein the undesired entry comprises a reference to one of subscription content and paid content.

3. The method of claim 1, further comprising searching the integrated program guide by at least one of content type and naming of content.

4. The method of claim 1, further comprising authenticating using a credential to access the integrated program guide.

5. The method of claim 1, wherein the first source is associated with a first user and comprises one of a first set-top box, first television, and the first portable electronic device, and the second source is associated with a second user and comprises one of a second set-top box, a second television, and the second portable electronic device.

6. The method of claim 1, further comprising initiating playback of content using at least one of a uniform resource locator (URL) and a media manager invoking a locally stored file referred to by an entry in the integrated program guide.

7. The method of claim 1, further comprising copying a history of selections of entries of the first aggregated program guide from the first source and discarding entries in the integrated program guide that were copied from the first aggregated program guide that are not in the history.

* * * * *